(12) United States Patent
Lesage

(10) Patent No.: US 9,462,080 B2
(45) Date of Patent: Oct. 4, 2016

(54) MANAGEMENT SERVICE TO MANAGE A FILE

(75) Inventor: Philippe Lesage, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 13/457,739

(22) Filed: Apr. 27, 2012

(65) Prior Publication Data

US 2013/0290477 A1 Oct. 31, 2013

(51) Int. Cl.
| | |
|---|---|
| G06F 15/16 | (2006.01) |
| G06F 15/173 | (2006.01) |
| G06F 17/30 | (2006.01) |
| H04L 29/08 | (2006.01) |
| H04L 29/06 | (2006.01) |

(52) U.S. Cl.
CPC ......... *H04L 67/34* (2013.01); *G06F 17/30861* (2013.01); *H04L 63/10* (2013.01); *H04L 67/10* (2013.01)

(58) Field of Classification Search
CPC ....... H04L 67/02; H04L 67/04; H04L 67/06; H04L 67/10; H04L 63/10; H04L 67/34; G06F 17/30861; G06F 9/5055
USPC .......... 709/203, 226; 713/193; 707/694, 703
See application file for complete search history.

(56) References Cited

U.S. PATENT DOCUMENTS

| | | | |
|---|---|---|---|
| 5,448,634 A * | 9/1995 | Satomi ............... | H04Q 11/0407 379/112.06 |
| 5,805,810 A | 9/1998 | Maxwell | |
| 6,871,065 B2 * | 3/2005 | Yamaguchi ............. | H04W 4/00 455/3.01 |
| 6,909,518 B2 | 6/2005 | Miller et al. | |
| 6,975,419 B2 | 12/2005 | Staas et al. | |
| 6,976,082 B1 | 12/2005 | Ostermann et al. | |
| 7,130,807 B1 * | 10/2006 | Mikurak ................ | G06Q 10/06 705/7.25 |
| 7,143,210 B2 | 11/2006 | Ferlitsch | |
| 7,248,859 B2 * | 7/2007 | Yamaguchi ............. | H04W 4/00 455/414.1 |
| 7,296,058 B2 | 11/2007 | Throop | |
| 7,663,652 B1 | 2/2010 | Reese | |
| 7,715,041 B2 | 5/2010 | Henke et al. | |

(Continued)

FOREIGN PATENT DOCUMENTS

| | | |
|---|---|---|
| CN | 1703749 A | 11/2005 |
| CN | 102073805 A | 5/2011 |
| CN | 102143228 | 8/2011 |
| JP | 2006094176 | 4/2006 |
| WO | WO-2013/065056 | 10/2013 |

OTHER PUBLICATIONS

Frogmore Computer Services Ltd., "Print Your Emails Automatically with Mail Print," Frogmore Software for Printing, Copyright 1998-2011 Frogmore Computer Services Ltd., [Online] http://www.frogmorecs.com/mailprint (4 pages).

(Continued)

*Primary Examiner* — Viet Vu
*Assistant Examiner* — Michael A Chambers
(74) *Attorney, Agent, or Firm* — HP Inc Patent Department

(57) ABSTRACT

A method to manage a file is provided herein. The method includes use of a management service that receives the file from a peripheral device. The management service determines at least one file destination associated with a web-based service for the file. The management service transmits the file to at least one file destination with an application programming interface associated with the web-based service and an authorization stored on the management service.

23 Claims, 6 Drawing Sheets

(56) References Cited

U.S. PATENT DOCUMENTS

| | | |
|---|---|---|
| 7,831,676 B1 | 11/2010 | Nagar |
| 7,873,695 B2 | 1/2011 | Clegg et al. |
| 7,882,186 B1 | 2/2011 | Sun |
| 7,886,038 B2 | 2/2011 | Ferris |
| 7,949,755 B2* | 5/2011 | Katoh ............... H04L 12/5695 709/226 |
| 7,957,991 B2* | 6/2011 | Mikurak ............. G06Q 10/06 705/7.11 |
| 7,970,843 B2 | 6/2011 | Brown et al. |
| 8,086,687 B2 | 12/2011 | Matoba |
| 8,150,920 B2 | 4/2012 | Forstadius |
| 8,179,549 B1 | 5/2012 | Evans |
| 8,214,329 B2* | 7/2012 | Gilder ............... G06F 17/30566 707/622 |
| 8,214,335 B2 | 7/2012 | Hamilton, II et al. |
| 8,261,295 B1* | 9/2012 | Risbood ............. G06F 8/61 717/177 |
| 8,275,853 B2* | 9/2012 | Almeida ............. G06F 9/5027 709/203 |
| 8,306,975 B1 | 11/2012 | Eldering |
| 8,326,814 B2* | 12/2012 | Ghods ............... G06F 9/541 707/703 |
| 8,352,941 B1* | 1/2013 | Protopopov ........ G06F 9/45558 718/1 |
| 8,370,913 B2 | 2/2013 | Hodgkinson et al. |
| 8,418,257 B2* | 4/2013 | Hoogerwerf ........ G06F 3/04883 726/26 |
| 8,433,765 B2* | 4/2013 | Dolin ............... G06Q 50/01 709/206 |
| 8,448,170 B2* | 5/2013 | Wipfel ............. H04L 9/3213 718/1 |
| 8,577,957 B2* | 11/2013 | Behar ............... G06F 1/162 709/203 |
| 8,578,076 B2* | 11/2013 | van der Linden .... G06F 9/5077 709/227 |
| 8,589,957 B2* | 11/2013 | Paul ............... G06F 9/54 709/201 |
| 8,593,677 B2* | 11/2013 | Nishimi ............. G06F 3/1204 358/1.15 |
| 8,607,137 B2* | 12/2013 | Wang ............... G06F 17/30873 715/206 |
| 8,676,900 B2 | 3/2014 | Yruski et al. |
| 8,699,049 B2 | 4/2014 | Sugiyama |
| 8,787,367 B2* | 7/2014 | Vendrow .................. 370/389 |
| 8,813,170 B2 | 8/2014 | Novak et al. |
| 8,842,338 B2 | 9/2014 | Hayakawa et al. |
| 2001/0029177 A1* | 10/2001 | Yamaguchi ............ H04W 4/00 455/414.3 |
| 2004/0193717 A1* | 9/2004 | Tajima ............... H04N 1/00954 709/228 |
| 2005/0068560 A1 | 3/2005 | Ferlitsch |
| 2005/0068562 A1 | 3/2005 | Ferlitsch |
| 2005/0068564 A1 | 3/2005 | Ferlitsch |
| 2005/0068574 A1 | 3/2005 | Ferlitsch |
| 2005/0085229 A1* | 4/2005 | Yamaguchi ............ H04W 4/00 455/432.2 |
| 2006/0077456 A1 | 4/2006 | Aoki |
| 2006/0149677 A1 | 7/2006 | Shahine et al. |
| 2006/0259590 A1 | 11/2006 | Tsai et al. |
| 2007/0240161 A1* | 10/2007 | Prabhakar ........... G06F 9/5044 718/104 |
| 2008/0004075 A1 | 1/2008 | Horton |
| 2008/0316521 A1* | 12/2008 | Lesage ............... H04N 1/32614 358/1.14 |
| 2009/0043857 A1 | 2/2009 | Ferlitsch |
| 2009/0089109 A1* | 4/2009 | Rabetge ............. G06F 9/44505 705/7.29 |
| 2009/0125612 A1* | 5/2009 | Rabetge ............. H04L 67/306 709/220 |
| 2009/0150417 A1* | 6/2009 | Ghods ............... G06F 9/541 |
| 2009/0177514 A1 | 7/2009 | Hudis et al. |
| 2009/0282086 A1 | 11/2009 | Heimes |
| 2009/0300511 A1* | 12/2009 | Behar ............... G06F 1/162 715/745 |
| 2009/0303676 A1* | 12/2009 | Behar ............... G06F 1/162 361/679.27 |
| 2009/0322790 A1* | 12/2009 | Behar ............... G06F 1/162 345/659 |
| 2010/0036926 A1 | 2/2010 | Ahart et al. |
| 2010/0228819 A1* | 9/2010 | Wei ................ G06F 9/505 709/205 |
| 2010/0229243 A1* | 9/2010 | Lin ................ G06F 17/30896 726/27 |
| 2010/0245888 A1 | 9/2010 | Nguyen et al. |
| 2010/0250683 A1 | 9/2010 | Hoyne et al. |
| 2010/0254375 A1* | 10/2010 | Feuerhahn ............ H04L 67/02 370/352 |
| 2010/0265531 A1 | 10/2010 | Nitta |
| 2010/0269067 A1 | 10/2010 | De Bel Air et al. |
| 2010/0302579 A1 | 12/2010 | Nuggehalli et al. |
| 2010/0318609 A1* | 12/2010 | Lahiri ............... G06F 9/5072 709/205 |
| 2010/0332876 A1* | 12/2010 | Fields, Jr. ........... G06F 1/3203 713/323 |
| 2010/0333116 A1* | 12/2010 | Prahlad ............. G06F 17/3002 719/328 |
| 2011/0022812 A1* | 1/2011 | van der Linden .... G06F 9/5077 711/163 |
| 2011/0058202 A1 | 3/2011 | St. Jacques, Jr. et al. |
| 2011/0075199 A1 | 3/2011 | Jung et al. |
| 2011/0087651 A1* | 4/2011 | Westin ............... G06F 17/3028 707/722 |
| 2011/0110373 A1 | 5/2011 | Ghosh et al. |
| 2011/0119104 A1 | 5/2011 | Levine et al. |
| 2011/0126197 A1* | 5/2011 | Larsen ............... H04L 9/3213 718/1 |
| 2011/0126207 A1* | 5/2011 | Wipfel ............. H04L 9/3213 718/104 |
| 2011/0153752 A1 | 6/2011 | Seaman |
| 2011/0161973 A1* | 6/2011 | Klots ............... G06F 17/30566 718/104 |
| 2011/0167105 A1* | 7/2011 | Ramakrishnan ........ H04W 4/18 709/203 |
| 2011/0188063 A1 | 8/2011 | Nuggehalli et al. |
| 2011/0246817 A1* | 10/2011 | Orsini ............... G06F 11/1076 714/6.1 |
| 2011/0265169 A1 | 10/2011 | Bauer-Hermann et al. |
| 2011/0314082 A1* | 12/2011 | Koneti ............... G06F 9/5055 709/203 |
| 2011/0314528 A1* | 12/2011 | Dolin ............... G06Q 50/01 726/7 |
| 2012/0036048 A1* | 2/2012 | Robb ............... G06Q 30/02 705/27.2 |
| 2012/0072723 A1* | 3/2012 | Orsini ............... G06F 21/6209 713/165 |
| 2012/0081741 A1 | 4/2012 | Lida |
| 2012/0084365 A1 | 4/2012 | McCann |
| 2012/0092723 A1 | 4/2012 | Jaudon et al. |
| 2012/0134355 A1* | 5/2012 | Vendrow ............. G06F 11/2048 370/389 |
| 2012/0147420 A1* | 6/2012 | Nishimi ............. G06F 3/1204 358/1.15 |
| 2012/0158821 A1* | 6/2012 | Barros ............. G06F 17/30563 709/203 |
| 2012/0166576 A1* | 6/2012 | Orsini ............... G06F 11/1471 709/217 |
| 2012/0166616 A1* | 6/2012 | Meehan ............. G06Q 10/0639 709/224 |
| 2012/0232973 A1* | 9/2012 | Robb ............... G06Q 30/0214 705/14.17 |
| 2012/0233315 A1* | 9/2012 | Hoffman ............. G06F 9/5072 709/224 |
| 2012/0240135 A1* | 9/2012 | Risbood ............. G06F 8/61 719/328 |
| 2012/0246012 A1* | 9/2012 | Gower ............... G06Q 30/0277 705/14.69 |
| 2012/0303736 A1* | 11/2012 | Novotny ............. H04L 67/1097 709/213 |
| 2012/0317132 A1 | 12/2012 | Brady et al. |
| 2013/0117678 A1* | 5/2013 | Sun ................ G06F 9/455 715/738 |
| 2013/0166712 A1* | 6/2013 | Chandramouli ........ G06F 9/505 709/223 |

(56) References Cited

U.S. PATENT DOCUMENTS

| | | | |
|---|---|---|---|
| 2013/0173916 A1* | 7/2013 | Sato | G06F 21/6218 713/165 |
| 2013/0185364 A1 | 7/2013 | Bhatia | |
| 2013/0275973 A1* | 10/2013 | Greenfield | G06F 9/44584 718/1 |
| 2013/0290477 A1* | 10/2013 | Lesage | 709/217 |
| 2014/0006355 A1* | 1/2014 | Kirihata | G06F 17/30233 707/654 |
| 2014/0078542 A1 | 3/2014 | Murayama | |
| 2014/0153048 A1 | 6/2014 | Sugiyama | |
| 2014/0300923 A1 | 10/2014 | Sarangamath | |
| 2014/0351606 A1* | 11/2014 | Demilo | G06F 17/30082 713/193 |
| 2015/0036174 A1 | 2/2015 | Pettis et al. | |

OTHER PUBLICATIONS

Hewlett-Packard Development Company, L.P., "Help and Tips," May 7, 2011, <http://web.archive.org/web/20110507090937/http://h30495.www3.hp.com/help?> (25 pages).

International Search Report & Written Opinion received for PCT Application No. PCT/IN2011/000750, Aug. 9, 2012, 11 pages.

Wikipedia, "HP ePrint," Oct. 16, 2011, <http://web.archive.org/web/20111016081246/http://en.wikipedia.org/wiki/HP_ePrint> (7 pages).

George Mikolay, "Services 'The Buzz' at Ricoh's Dealer Show, Host of New Products Announced," Jun. 6, 2011, Buyer's Lab, <http://www.buyerslab.com/news/viewarticle.asp?article=75840> (2 pages).

PAPERACT, "White Paper—Scan Directly to the Cloud," available at http://www.paperact.com/wp_stage/wp-content/uploads/2011/08/White-Paper-PaperAct-Scan-to-Cloud.pdf, Dec. 2011 (3 pages).

Ricoh Americas Corporation, "Print Cloud User's Guide," 2011, ver. 1.4, <http://www.ricoh-cloud.com/files/PrintCloud_UserGuide_1.7.pdf> (63 pages).

Soonr Workplace, "Print Cloud," Jul. 29, 2011, (screenshots), <https://www.youtube.com/watch?v=99Lsuj8T4N8> (38 pages).

Wikipedia, "File hosting service," Mar. 31, 2012, <https://en.wikipedia.org/w/index.php?title=File_hosting_service&oldid=484780356> (5 pages).

Wikipedia, "Image scanner," Sep. 30, 2011, <http://en.wikipedia.org/w/index.php?title=Image_scanner&oldid=453210700> (11 pages).

* cited by examiner

MANAGEMENT SERVICE TO MANAGE A FILE

BACKGROUND

Peripheral devices scan documents and transmit the documents to a file destination. In order to transfer the file to the file destination, the peripheral device includes firmware for each file destination and the peripheral device is connected to the file destination and/or a computing device to transmit the file.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
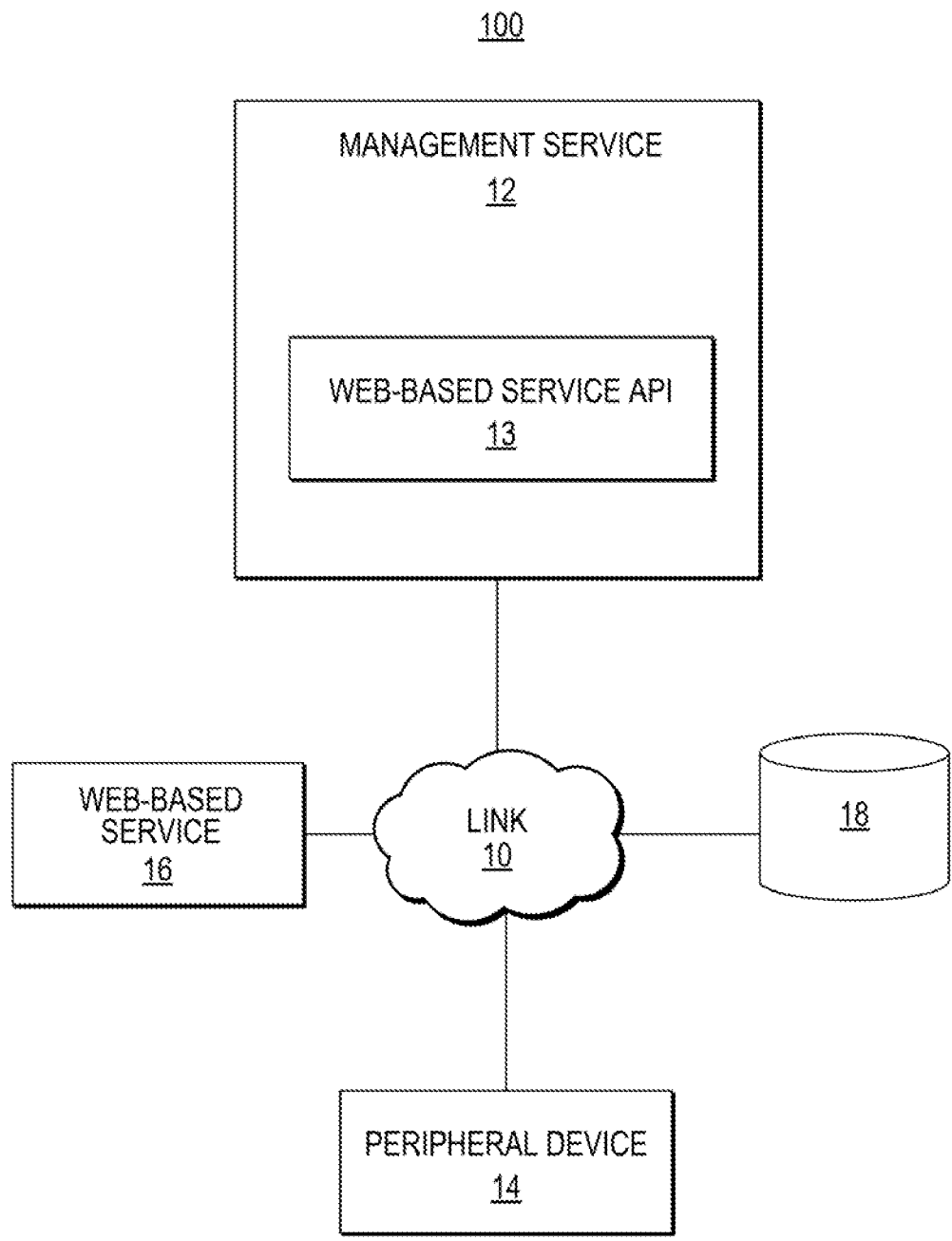
FIG. 1 illustrates a schematic diagram of a system to manage a file according to an example.

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure.

Peripheral devices may include firmware to connect to a computing device and/or to transfer data to a web-based service over the internet. When the peripheral device is connected to a computing device, the peripheral device transfers the file to the computing device and saves the file on a hard drive of the computing device. To transmit the file to one or a plurality of file destination, the user then separately logs into each web-based service and manually uploads the file from the hard drive to the web-based service. When the peripheral device is a web-connected device, the peripheral device includes a web application for each web-based service that a file may be transmitted to. Each web application is predefined and only allows a user to send the document to a specific destination that cannot be modified. In order to transmit the document to a plurality of destinations, each web application must be separately accessed and used via the peripheral device. Moreover, any notifications provided are manually initiated using a program separate from the web application.

In examples, a method, apparatus, and system to manage a file is provided herein. The method includes use of a management service that receives the file from a peripheral device. The management service determines at least one file destination associated with a web-based service for the file. The management service transmits the file to at least one file destination with an application programming interface associated with the web-based service and an authorization stored on the management service.

As used herein, the phrase "management service" refers to a centralized web-based service that connects a peripheral device to a plurality of web-based services. The management service may include a combination of device(s), such as servers; and application(s), such as software and/or firmware, that link, set-up, and/or authorize web-based service accounts. A user can use the management service to access and manage a plurality of web-based service accounts through programs and setting on the management service that are accessible via, for example, a website. The management service includes application programming interfaces (APIs) of one or more web-based or cloud-based services to facilitate access and management of the web-based service accounts.

As used herein the phrase "web-based service" refers to an electronic service accessible via a network connection, such as a webpage or website on the World Wide Web or a private network.

As used herein the phrase "management application" refers to an application that connects a peripheral device to a file management service. The management application enables transmission of files and/or content therebetween. The management service allows for files to be managed over a network and/or the like in a centralized location that does not require the peripheral device to manage the application programming interface. Instead, the management service stores and manages the application programming interface for multiple web-based services and manages the user accounts associated with the web-based services to enable access to the web-based services and transmission of data therebetween, such as the transmission of the file to the file destination.

As used herein, the term "manage" or "managed" refer to a plurality of actions, such as transmit, evaluate, store, save, email, reformat, and/or modify.

As used herein, the term "file" refers to an electronic document capable of being saved or stored, modified, evaluated, reformatted on a computing device or data store and/or emailed or transmitted over a network.

As used herein, the phrase "peripheral device" refers to a device connectable to a computing device via a network connected to allow transmission of data therebetween. The peripheral device includes firmware to connect the peripheral device to the management service.

As used herein, the phrase "file destination" refers to a device and/or service that is capable of receiving a file, such as memory or datastore connected to a computing device and/or an email server.

As used herein, the term "instruction" refers to content used to manage the file, such as the destination, settings, and/or accounts.

As used herein, the terms "scan," "scans," and "scanning" include electronically scanning a media, such as a sheet of paper, and/or scanning data from an electronic device, such as an electronic copy of a document from a computing device and/or mobile device or a message, i.e., an email message.

FIG. 1 illustrates a schematic diagram of a system 100 to manage a file using a management service 12. The system 100 includes a link 10 that connects a management service 12, a peripheral device 14, and a web-based service 16. The system 100 also includes a data store 18, but may include further components.

The link 10 represents generally one or more of a cable, wireless, fiber optic, local, or remote connections via a telecommunication link, an infrared link, a radio frequency link, or any other connectors or systems that provide electronic communication. The link 10 may include, at least in part, an intranet, the Internet, or a combination of both. The link 10 may also include intermediate proxies, routers, switches, load balancers, and the like.

The management service 12 represents generally any computing device or combination of computing devices configured to communicate with a peripheral device 14 and a web-based service 16 via a web-service application programming interface 13 over a link 10, such as an internet connection. For example, the management service 12 includes a management device with a memory that stores a set of instructions and a processor coupled to the memory to execute the set of instructions to manage the file, as further described below in FIG. 2.

The management service 12 receives the file from the peripheral device 14 and determines at least one file destination associated with the web-based service 16 for the file. For example, the at least one file destination includes a storage account on a web-based service 16 or cloud service, such as Dropbox™, FilesAnywhere®, Evernote®, Box.net$^{SM}$, or OfficeDrop. The management service 12 may also receive an instruction associated with the file from the peripheral device 14 and/or a setting associated with an account on the management service 12. Based on the file and instruction, the management service 12 transmits the file to at least one file destination of a linked web-based service 16.

The management service 12 includes at least one application programming interface 13 or web-based service application programming interface 13 and may include a plurality of application programming interfaces. Each of the at least one application programming interface 13 is associated with a web-based service 16 that is capable of being linked to the management service 12 to transmit the file to the at least one file destination. The web-based service application programming interface 13 interacts with the management service 12 and the web-based service 16 to transmit the file to the file destination.

The file transmission to the file destination associated with the web-based service 16 also includes an authorization stored on the management service 12. The authorization includes, for example, a username/password combination, a key, and/or other authentication methods that verify or confirm access to an account on a web-based service 16. Using the management service 12 enables the user to access one or more web-based services via a single service that contains the application programming interfaces 13 for the web-based services 16. The management service 12 also reduces the limitations of the peripheral device 14, such as firmware for the plurality of application programming interfaces 13 and compatibility issues between the peripheral device 14 and the web-based service 16.

The peripheral device 14 transmits the file to the management service 12. For example, the peripheral device 14 may be a multi-function printing and scanning device, a scanning device, a wireless or mobile device, and/or a computing device that scans a file in an electronic format. The peripheral device 14 may also include a management application associated with the management service 12 that enables transmission of the file to the management service 12. The management application may also enable content to be received from a user and/or provided to the user, via for example a user interface and/or buttons on the peripheral device 14. The content may include initiation of a scan, selection of options related to the file, such as quality, the at least one destination, and/or management of the file; and/or a notification of the status of the transmission, such as success and failure of the transmission to the management service 12 and/or the at least one destination associated with a web-based service 16.

The peripheral device 14 represents generally a peripheral device 14 and/or a combination of peripheral devices that is/are not part of the management service 12 and is more or less dependent on the management service 12. For example, the peripheral device 14 may expand the management service's 12 capabilities, while not forming part of the core architecture of the management service 12. As illustrated in FIG. 1, the peripheral device 14 is connected to the management service 12, such that the peripheral device 14 interacts with the management service 12 via the link 10.

The web-based service 16 is an electronic service accessible via a network connection, such as a webpage on the World Wide Web or a private network. The web-based service 16 is capable of receiving a file from the management service 12. After receiving the file, the web-based service 16 performs a specific function or task with the file, such as storage of the file in an account, editing or modifying the file, and/or providing the file for use by others, i.e., in a common repository. Typically, the web-based service 16 includes user accounts that provide a user with the ability to create and access an account associated with the web-based service 16 through the link 10, such as an internet connection. Advantages of the web-based service 16 include the ability to access the account from anywhere via the link 10. Examples of the web-based service 16 include Dropbox™, FilesAnywhere®, Evernote®, Box.net$^{SM}$, or OfficeDrop.

The data store 18 represents generally any memory configured to store data that is accessible via the link 10, such as by the management service 12, the peripheral device 14, and the web-based service 16 in the performance of functions associated therewith. For example, the data store 18 may store account information, the file, the set of instructions or instructions to be executed by the processor, and/or application programming interfaces 13 for a web-based service 16.

Figure 2:
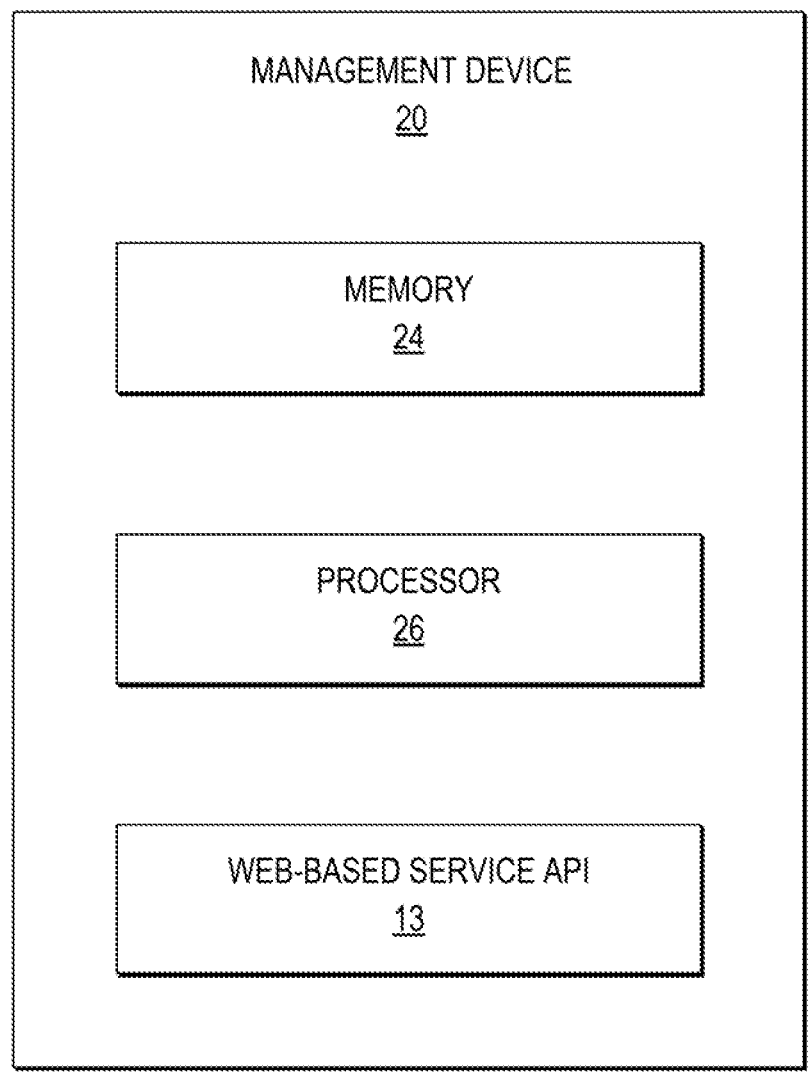
FIG. 2 illustrates a block diagram of an apparatus to manage a file according to an example.

FIG. 2 illustrates a block diagram of an apparatus 200 useable with a management service 12 of FIG. 1. The apparatus 200 includes a management device 20, for example, a server and/or a combination of servers. The management device 20 is connected to a peripheral device 14, such that the management device 20 receives a file from the peripheral device 14.

The management device 20 manages the file using, for example a memory 24, a processor 26, and the application programming interface 13. The memory 24 stores a set of instructions. The processor 26 is coupled to the memory 24 to execute the set of instructions to perform functions to manage the file. The set of instructions cause the processor 26 to receive the file from the peripheral device 14, determine at least one file destination associated with a web-based service 16 for the file, and transmit the file to the at least one file destination using an authorization stored on the management service 12. The memory 24 may also store data resulting from the execution of the set of instructions, such as the file and/or account information, as discussed below.

The management service 12 uses the application programming interface 13 to transmit the file to the at least one file destination that is also associated with the web-based service 16, i.e., the file destination. The application programming interface 13 is associated with the web-based service 16, such as Dropbox™, as illustrated in FIG. 1. The application programming interface 13 is on and/or connected to the management service 12. The at least one application programming interface 13 may include a plurality of application programming interfaces (APIs) 13, with one application programming interface 13 being associated with each web-based service 16 that the management service 12 is connectable to. The web-based services 16 provided are determined by the management service 12 and/or account settings established by the user. For example, the management service 12 may include a plurality of application programming interfaces, such as a Dropbox™ API associated with Dropbox™ and a FilesAnywhere® API associated with FilesAnywhere®.

To use the APIs, a user sets up an account through the management service 12 and links the management service account to a web-based service account. For example, the user may link a Dropbox™ account and FilesAnywhere® account to the management service account, such that the management account may then transmit files to the user's Dropbox™ account and/or Files Anywhere® account based on the user's instructions and/or account settings. The user is then capable of logging into and/or accessing the management service 12. The management service 12 becomes the connection between the peripheral device 14 and the web-based service 16, allowing submission of files to the file destination, for example, one or both of the Dropbox™ account and FilesAnywhere® account, using a single service or log-in through the management service 12.

The user accounts on the management service 12 may include user information including web-based services, access or log-in information for the web-based service, preferences for the transmission of the file to the file destination. For example, a user may add preferences to the account by selecting the web-based service and/or file destination for the file. The preferences may be manually entered initially and updated by the user manually over time and/or automatically updated and customized based on the user's actions and/or selections over time. The user may also schedule a time to receive and/or transmit the file to the file destination. The management service 12 further includes a website to access and update the user account and settings of the management service 12.

The management service 12 may also include an instruction associated with the file. The instruction associated with the file may be received from the user via the peripheral device 14, such as through a user interface. The instruction may also be associated with the file by a setting of the user account on the management service 12. The file may be temporarily stored and/or transmitted to the data store 18 and/or a content device connected to the apparatus 200 via the link 10, as illustrated in FIG. 1.

Figure 3:
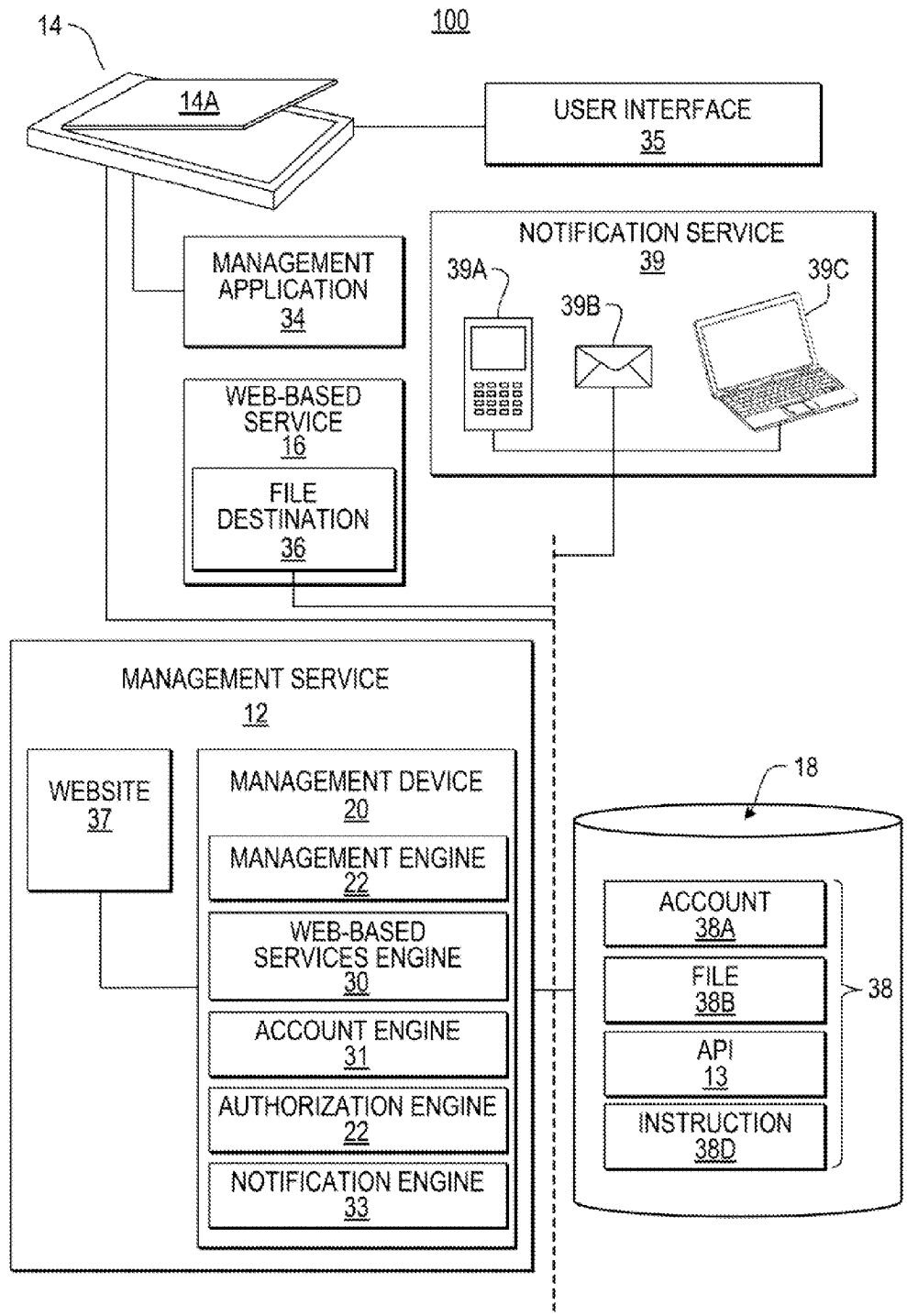
FIG. 3 illustrates a block diagram of the system of FIG. 1 according to a further example.

Referring to FIG. 3, a block diagram of the system 100 of FIG. 1 is illustrated according to a further example. The block diagram illustrates the link 10 connecting the management service 12 to the peripheral device 14, the web-based service 16, the data store 18, and the notification service 39. The management service 12 includes at least the apparatus of FIG. 2, such as, the management device 20 with, for example, a management engine 22 associated with the memory 24, the processor 26, the web-based service API 13 and may include further components, such as a web-based services engine 30, an account engine 31, an authorization engine 32, and a notification engine 33.

The management engine 22 represents generally any combination of hardware and/or programming to manage a file that is received from the peripheral device 14, such as a scanning device 14A. For example, the management engine 22 interacts with firmware on the peripheral device 14 to assist with scanning and transmitting the file to the management service 12.

The web-based services engine 30 represents generally any combination of hardware and/or programming to manage and link the web-based services associated with the management device. For example, the web-based service engine 30 may include the web-based services API for each web-based service 16 associated with the management service 12.

The account engine 31 represents generally any combination of hardware and/or programming to manage a user account on the management service 12. For example, the each user of the management services has a distinct account on the management service and each user account on the management service may be linked to web-based services via the user's web-based service account which is distinct from the management service account, but capable of being linked via the web-based service API. The management service 12 uses information associated with the user's account information to access the web-based service(s) associated therewith, such information includes account settings and preferences for the management services 12 and/or user names and passwords for the web-based accounts.

The authorization engine 32 represents generally any combination of hardware and/or programming to authorize a transmission of the file. For example, the authorization engine 32 verifies access to the linked web-based services account via for example a user name and password and/or additional methods such as a security key or certificate to ensure a secure transmission of the file. The authorization engine 32 may also contain additional information to commence the transmission of the file to the file destination.

The notification engine 33 represents generally any combination of hardware and/or programming to provide a notification of the status of a transmission of the file to the at least one file destination. For example, the notification engine 33 may indicate a success or failure at different times during the transmission of the file from the peripheral device 14 to the file destination, such as when the file is transmitted to and/or received by the management service 12 and when the file is transmitted to and/or received by the file destination.

The management engine 22, the web-based services engine 30, the account engine 31, the authorization engine 32, and notification engine 33 may include the memory 24 and the processor 26, as illustrated and described in FIG. 2. The functionality of the management engine 22, the web-based services engine 30, the account engine 31, the authorization engine 32, and notification engine 33, are further described below in FIG. 4.

The management service 12 functionalities may be accomplished using a memory 24 on the management device 20 or a data store 18 connected to the management service 12 via the link 10. The data store 18 is physically located on the management device 20 and/or on a separate device connected to the management device 20 via the link 10, such as a database on a server, or a disc insertable into the management device 20. The data store 18 stores a variety of content 38, such as account information 38A, a file 38B, the web-based services API 13, and/or the set of instructions 38D that are executed by the processor 26. The data store 18 may be adapted to store additional content based on the functionalities of the management service 12.

The set of instructions 38D stored in the data store 18 include instructions to receive the file from the peripheral device, determine at least one file destination associated with a web-based service 16 for the file, and transmit the file to the at least one file destination using an authorization stored on the management service 12. The memory 24 and/or data store 18 may also store content 38 resulting from the execution of the set of instructions 38D, such as the file, i.e., a copy of the file received from the peripheral device 14. Moreover, the account information stored in the data store 18 may include a user account for each user that contains a log-in for the web-based service, an account setting, such as a file destination, a file format, and a notification instruction. The web-based service application programming interface 13 includes an application programming interfaces associated with the web-based service, where each web-based service may include a separate web-based service API.

The files 38B may be stored on a database, such as the data store 18 and/or separate databases. The files 38B may be stored on the database temporarily before transmission to the file destination and/or permanently as a copy of the file transmitted to the file destination as the file destination. The data store 18 may also store a set of instructions 38D to manage the file from the peripheral device 14, such as the scanning device 14A, via the management service 12. The set of instructions 38D may be stored in a data store 18, such as a database external to the management service 12, a disc, and/or a data storage device on the management device 20, such as the memory 24.

The peripheral device 14 is illustrated as a scanning device 14A. The peripheral device 14 represents generally a peripheral device 14 and/or a combination of peripheral devices 14. The peripheral device 14 represents a device that is not part of the management service 12 and is more or less dependent on a computing device, such as the management device 20 of the management service 12. For example, the scanning device 14A may expand the management service's 12 capabilities, while not forming part of the core architecture of the management device 12.

As illustrated in FIG. 3, the scanning device 14A is connected to the management service 12, such that the scanning device 14A interacts with the management service 12 via the link 10. The scanning device 14A scans a document to create an electronic file to be received by the management service 12. The peripheral device 14 may further include a management application 34 on and/or connected to a peripheral device 14. The management application 34 provides firmware and/or an application programming interface between the peripheral device 14 and the management service 12 to facilitate transmission of the file and communication therebetween.

The system 100 is illustrated to further include a user interface 35. The user interface 35 is connected to or integrated into the peripheral device 14, such as the scanning device 14A. For example, the user interface 35 may be a display on a peripheral device 14 and/or connected to the peripheral device 14 over a network, such as the link 10 of FIG. 1. The user interface 35 displays content, such as a list of options and/or a notification, from the management service 12 to a user and receive input from the user, such as an instruction and/or selection for transmission to the management service 12. The user interface 35 may be coupled to the management application 34 to display content, such as scan and file destination options, to a user and receives input from the user. For example, the user interface 35 may be utilized to initiate the scan, to provide a file destination 36 on a web-based service 16 and/or to indicate a selection of a notification method for a status of the transmission of the file The web-based service 16 is an electronic service accessible via a network connection, such as a website 37 on the World Wide Web or a private network. The web-based service 16 is capable of receiving a file from the management service 12. After receiving the file, the web-based service 16 performs a specific function or task with the file, such as storage of the file in an account, editing or modifying the file, and/or providing the file for use by others, i.e., in a common repository. Examples of the web-based service 16 include Dropbox™, FilesAnywhere®, Evernote®, Box.net$^{SM}$, or OfficeDrop. The web-based service 16 includes a file destination 36 that receives the file transmitted from the management service 12.

The system 100 further includes a notification service 39 to provide a notification of a successful and/or unsuccessful transmission of the file to the at least one file destination. The notification service 39 represents generally a computing device, a peripheral device, and/or a combination of computing and peripheral devices. The notification service 39 may be part of the management service 12 or a separate device that is not part of the management service 12 but may expand the management service's 12 capabilities, while not forming part of the core architecture of the management service 12. As illustrated in FIG. 3, the notification service 39 is connected to the management service 12 via the link 10, such that the notification service 39 interacts with the management service 12. The notification service 39 may perform at least one function, such as display a message regarding the transmission of the file from the peripheral device 14 to the web-based service 16 via the management service 12. For example, the message may provide information to a user regarding the successful and/or unsuccessful transmission of the file, such as confirmation of a successful receipt of the file to the management service 12 and/or successful transmission of the file to the at least one file destination 36. In addition, the notification may be delivered to the user through, for example, a mobile device 39A, such as a text message, an email 39B, and/or a graphical user interface on a computing device 39C, such as an instant message; however, other communication devices with the functionality described herein may also be used to perform the above described functionality.

Figure 4:
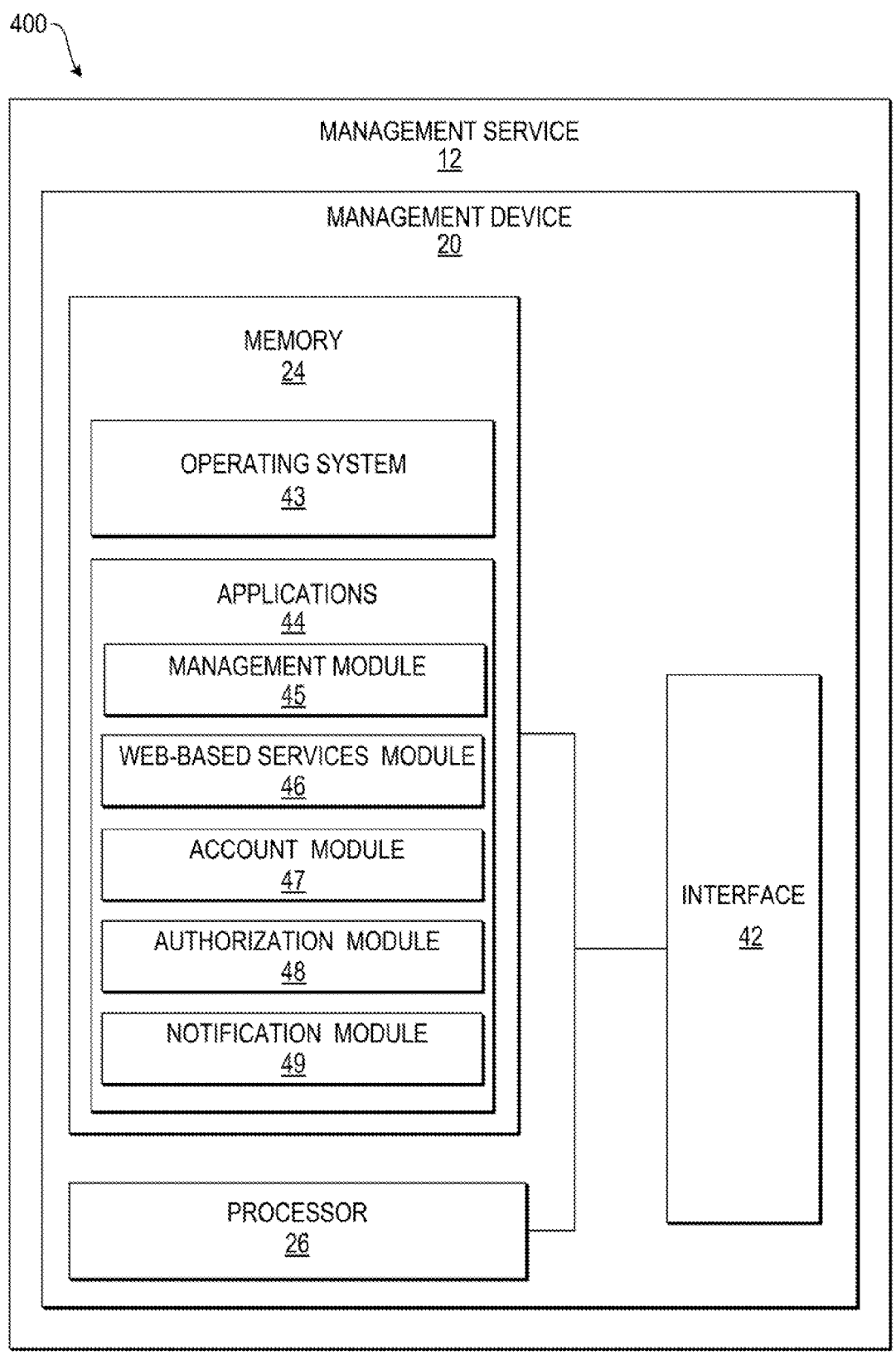
FIG. 4 illustrates a block diagram of a computer readable medium useable with the system of FIG. 1 according to an example.

Referring to FIG. 4, a block diagram of an example of a computer readable medium 400 useable with the system of FIG. 1 is illustrated. The computer readable medium 400 represents generally any combination of hardware and/or software to manage a file from a peripheral device 14. The computer readable medium 400 is part of the system of FIG. 1, such as a management service 12 on a cloud server system that operates with the management device 20. The management device 20 includes a memory 24 and a processor 26. For example, the memory 24 stores a set of instructions 38D and the processor 26 execute the set of instructions 38D. The set of instructions 38D cause the processor 26 to receive the file from the peripheral device 14, determine at least one file destination 36 associated with a web-based service 16 for the file, and transmit the file to the at least one file destination 36 using an authorization stored on the management service 12. The processor may further include instructions to: update an account, connect to a web-based service 16, authorize transmission of the file to the file destination 36, and/or notify the user of the status of the transmission of the file from the peripheral device 14 to the management service 12 and/or the web-based service 16. The processor 26 represents generally any processor configured to execute program instructions stored in the memory 24 to perform various specified functions.

An interface 42 provides interactive functions to a user via the peripheral device 14. The interface 42 represents generally an interface connected to the peripheral device 14 and/or the management device 20.

The memory 24 is illustrated to include an operating system 43 and applications 44. The operating system 43 represents a collection of programs that when executed by the processor 26 serve as a platform on which applications 44 may run. Examples of operating systems 43 include various versions of Linux's Red Hat®, Microsoft's Windows®, Apple's Mac OS®, Apple's iOS® (trademark licensed from Cisco), and Google's Android™.

Applications 44 represent program instructions that when executed by the processor 26 functions as an application, such as software that manages a file from a peripheral device 14. The executable program instructions stored in memory 24 are illustrated as including a management module 45, a web-based services module 46, an account module 47, an authorization module 48, and a notification module 49.

The management module 45 represents program instructions that when executed by a processor 26 cause the processor 26 to execute the instructions to receive the file from the peripheral device 14. The executable instructions stored in the management module 45 may include a set of instructions 38D from the data store 18 (FIG. 3). In response to the receipt of the file from the peripheral device 14, the management module further provides instructions to determine at least one file destination 36 associated with a web-based service 16 for the file and transmits the file to the at least one file destination 36 using an authorization stored on the management service 12.

The web-based services module 46 represents program instructions that when executed by a processor 26 cause the processor to run the web-based service application programming interface 13 and establish a connection between the management service 12 and the web-based service 16. For example, the web-based services module 46 may use the web-based service application programming interface 13 to connect to a user's account on the web-based service 16. The executable instructions stored in the web-based services module 46 may include the set of instructions 38D from the data store 18 (FIG. 3).

The account module 47 represents program instructions that when executed by a processor 26 cause the account settings to be set-up, updated, and/or modified. The account settings may be received from the website 37 via a computing device and/or through content from the peripheral device 14. For example, the account settings may be set-up from a computer, a mobile device 39A, and/or a scanning device 14A. The executable instructions stored in the account module 47 may include the set of instructions 38D from the data store 18 (FIG. 3).

The authorization module 48 represents program instructions that when executed by a processor 26 cause the connection between the management service 12 and the web-based service that authorizes the transmission of the file therebetween. The executable instructions stored in the authorization module 48 may include the set of instructions 38D from the data store 18 (FIG. 3) and authorization information may also be stored on the data store 18. In response the authorization, the file may be transmitted to the file destination 36 on the web-based service 16. The authorization module 48 provides further instructions to the processor 26 to provide a secure connection.

The notification module 49 represents program instructions that when executed by a processor 26 cause the processor to provide a notification of the transmission of the file to the at least one file destination. The notification may include a notification to a user via the peripheral device 14 and/or a separate device, such as a computing or mobile device. The notification may further trigger an event by the management service 12 and/or the web-based services 16 using, for example, the file. The executable instructions stored in the notification module 49 may include a set of instructions 38D from the data store 18 (FIG. 3).

Referring to FIGS. 3-4, the management engine 22, the web-based services engine 30, the account engine 31, the authorization engine 32, and the notification engine 33 are described as combinations of hardware and/or programming. The hardware portions may include the processor 26. The programming portions may include the operating system 43, applications 44, and/or combinations thereof. The programming may be processor executable instructions stored on a tangible memory media. The memory 24 may store program instructions that when executed by the processor 26 cause the processor to perform the program instructions, as described with respect to the management module 45, web-based services module 46, the account module 47, the authorization module 48, and the notification module 49. The memory 24 may be integrated in the same device as the processor 26 or it may be separate but accessible to that device and processor 26.

In some examples, the program instructions may be part of software that can be executed by the processor 26 to perform a method using the system 100. The memory 24 may be a portable medium such as a CD, DVD, or flash drive or a memory maintained by a server from which the software can be downloaded and installed. In other examples, the program instructions may be part of an application or applications already installed, for example scanner drivers installed on the management service 12. In further examples, the memory 24 may include integrated memory such as a hard drive.

Figure 5:
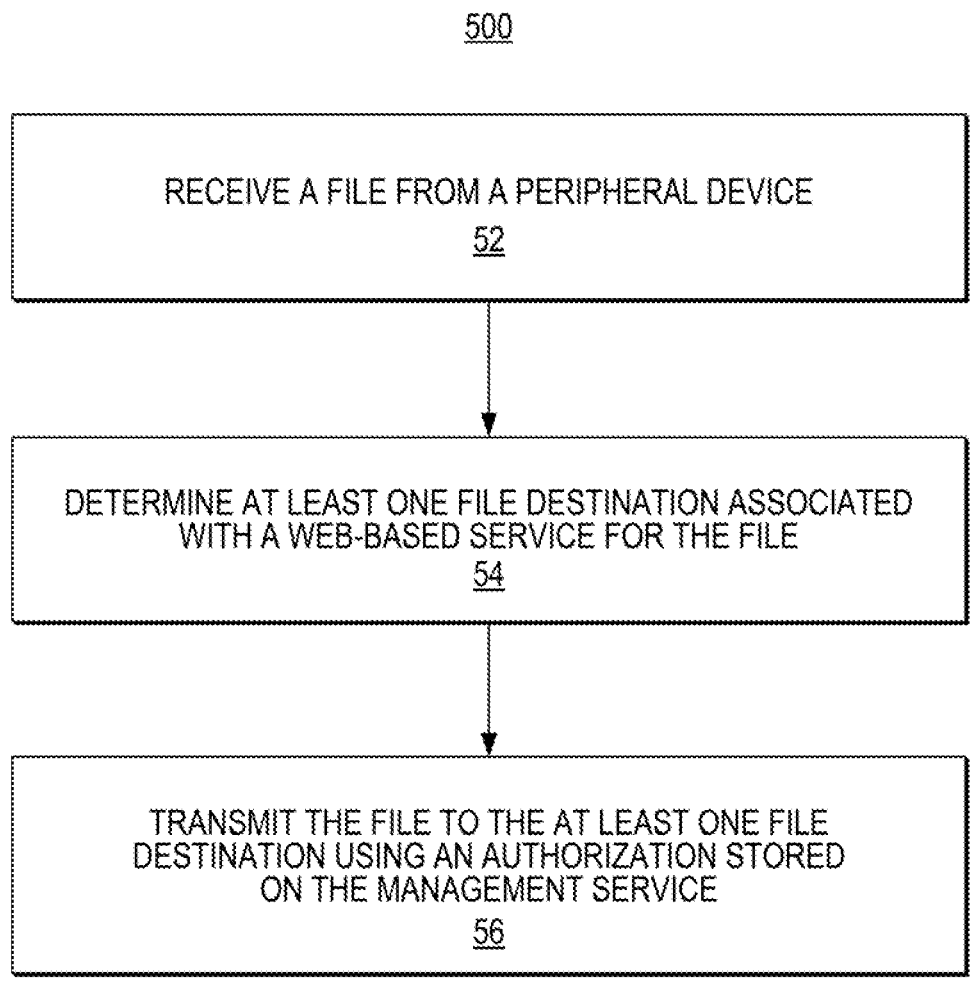
FIGS. 5-6 illustrate flow charts of methods to manage a file according to examples.

FIG. 5 illustrates a flow diagram 500 of a method to manage a file according to an example. The method 500 may be used, for example, with the system 100 and apparatus 200. The method 500 may be implemented by the management device on, for example, a cloud server using the application programming interface 13 associated with the web-based service and the peripheral device, as described in FIG. 5. The method 500 may be initiated by a user and/or automatically initiated based on predefined account settings and/or an event.

In block 52, a management service receives the file from a peripheral device. For example, a web-connected peripheral device with a management application obtains the file and transmits the file to the management service. The management service receives the file and proceeds according to account setting and/or an instruction included with the file. The management service determines at least one file destination associated with a web-based service for the file in block 54. The management service includes an application programming interface associated with the web-based service and an instruction associated with the file. The management service may connect to a plurality of web-based services. Each web-based service associated with the management service includes an application programming interface associated therewith. The management service transmits the file to one or a plurality of the web-based services using the application programming interfaces and the instruction. The instruction may be received from the peripheral device, such as via a user interface and/or from an account setting on the management service. Moreover, the management service may transmit the file to a default location based on account settings associated with the management service.

In block 56, the application programming interface transmits the file to the at least one file destination using an authorization stored on the management service. The application programming interface links the management service to one and/or a plurality of the web-based services. The file is transmitted to one and/or a plurality of distinct file destinations, according to a command from the user interface and/or an account setting. The management service and/or the application programming interface authorize the file destination. The authorization may be initially determined through the user account on the management service, such as via the website, and/or at the time the file is transmitted to the web-based service using the authorization module and the application programming interface.

Figure 6:
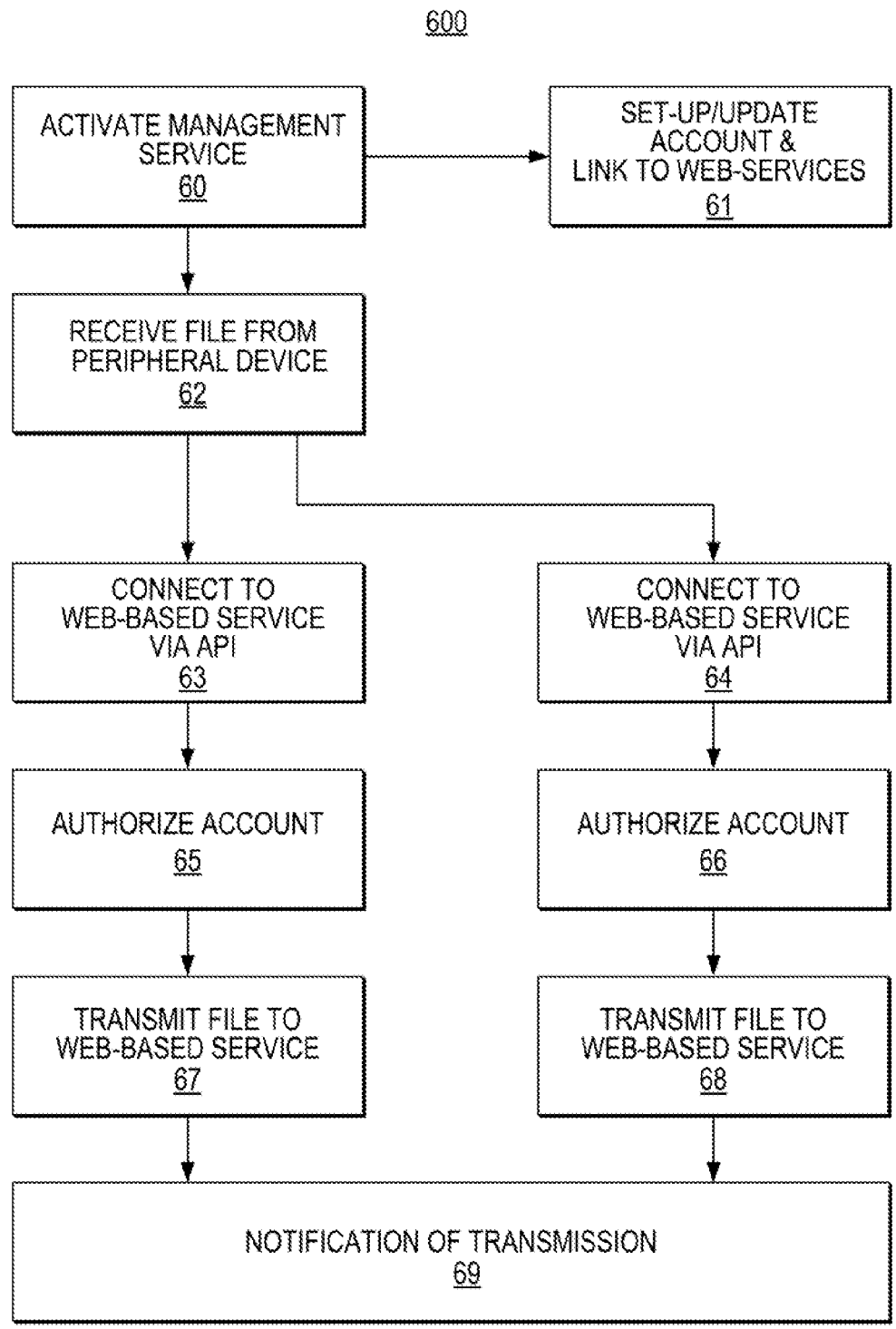

FIG. 6 illustrates a flow chart 600 of a method to manage a file, according to a further example. A user will initially activate a management service in block 60. The activation may include connecting to a peripheral device. The activation may also include setting-up and/or updating an account and/or linking the management service to web-based services, as illustrated in block 61. Typically, the activation of block 61 is performed prior to the first use of the management service and/or when a new web-based service is being used. In block 62, the management service 12 receives a file from the peripheral device. The file may also include an instruction, such as the file destination or the file destination may be determined based on account settings, such as the file type, the file size, and/or the peripheral device the file is received from. For example the user may set up rules within the account settings of the management service that indicate the file destination of the web-based service(s). FIG. 5 includes two file destinations for the file; however, one file destination and/or more than two file destinations may also be used.

The management service connects to web-services via an application programming interface (API) associated with each web-based service in blocks 63 and 64. For example, the user may request that the file may be transmitted to two distinct destinations, Dropbox™ and Evernote®, which would result in the management service connecting to both Dropbox™ and Evernote® simultaneously and/or in series. Blocks 65 and 66 illustrate that authorization of the user's accounts with each of the web-based services, i.e., Dropbox™ and Evernote®. After the authorization occurs, the files may be transmitted to the file destination associated with each of the services, i.e., Dropbox™ and Evernote®, in blocks 67 and 68. The transmission of the file to the web-based services may also provide one or more notifications via the management service, illustrated as a single notification in block 69; however, each transmission may include a separate notification and/or each transmission may include a plurality of notification based on the account settings. For example, the notification may be transmitted via an email, short message service (SMS), instant message, message on the user interface of the peripheral device to indicate successful and/or unsuccessful transmission(s) of the file(s).

Although the flow diagrams of FIGS. 5-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

FIGS. 1-6 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:
1. A method comprising:
receiving, with a management service in a computer system, a file from a web-connected peripheral device associated with a user of the management service;
receiving, by the management service, a user preference input by the user of the management service, the user preference specifying a selection of a first web-based service from a plurality of web-based services that provide respective destination storage locations;

adding, by the management service, the user preference into a user account of the management service, the added user preference including information relating to the selected first web-based service of the plurality of web-based services;

linking a user account of the selected first web-based service with the user account of the management service, wherein the user account of the selected first web-based service is associated with the user and is distinct from the user account of the management service;

determining, with the management service using the information relating to the selected first web-based service in the user account of the management service the destination storage location provided by the first web-based service for the file, the management service including a first application programming interface associated with the first web-based service; and transmitting, using the first application programming interface based on the linking of the user account of the selected first web-based service and the user account of the management service, the file to the determined destination storage location using an authorization stored by the management service.

2. The method of claim 1, wherein the transmitting comprises transmitting the file to a plurality of distinct destination storage locations, in response to the information in the user account of the management service identifying multiple web-based services of the plurality of web-based services, the method further comprising:

linking the user account of the management service to the user's user accounts of the multiple web-based services.

3. The method of claim 1, further comprising connecting the management service to the plurality of web-based services, each of the plurality of web-based services associated with a respective application programming interface in the management service.

4. The method of claim 1, further comprising providing a notification of the transmitting of the file to the determined destination storage location.

5. A system comprising:

a management device comprising at least one processor, a management service, and at least one application programming interface associated with a first web-based service, the management service executable on the at least one processor to:

receive, over a network, a file from a peripheral device associated with a user of the management service;

receive a user preference input by the user of the management service, the user preference specifying a selection of the first web-based service from a plurality of web-based services that provide respective destination storage locations;

add the user preference into a user account of the management service, the added user preference including information relating to the selected first web-based service of the plurality of web-based services, wherein the adding of the user preference into the user account of the management service comprises linking a user account of the selected first web-based service with the user account of the management service, the user account of the first web-based service being distinct from the user account of the management service;

determine, based on the information relating to the selected first web-based service in the user account of the management service, the destination storage location provided by the first web-based service; and transmit the file, using the application programming interface, to the determined destination storage location using an authorization stored by the management service.

6. The system of claim 5, wherein the peripheral device comprises a scanning device.

7. The system of claim 5, wherein the management device comprises a server.

8. The system of claim 5, wherein the management service is executable on the at least one processor to provide a notification relating to the transmitting of the file to the determined destination storage location.

9. The system of claim 5, further comprising a data store to store at least one of the file and the at least one application programming interface.

10. A non-transitory computer readable storage medium storing instructions of a management service that upon execution cause a system to:

receive, over a network, a file from a peripheral device associated with a user of the management service;

receive, by the management service, a user preference input by the user of the management service, the user preference specifying a selection of a first web-based service from a plurality of web-based services that provide respective destination storage locations;

add, by the management service, the user preference into a user account of the management service, the added user preference including information relating to the selected first web-based service of the plurality of web-based services;

link the user account of the management service to the user's user account of the first web-based service;

determine, with the management service using the information relating to the selected first web-based service added to the user account of the management service, the destination storage location provided by the first web-based service; and transmit the file, using an application programming interface associated with the first web-based service and included in the management service, to the determined destination storage location using an authorization stored by the management service, wherein transmitting the file using the application programming interface associated with the first web-based service is based on the linking of the user account of the management service to the user's user account of the first web-based service.

11. The method of claim 1, wherein the plurality of web-based services are associated with respective application programming interfaces included in the management service.

12. The method of claim 1, wherein transmitting the file to the determined destination storage location comprises transmitting the file to the first web-based service that stores the file at the determined destination storage location.

13. The method of claim 1, wherein the authorization is included in the user account of the management service, and the authorization includes authorization information of the user account of the first web-based service, the authorization information of the user account of the first web-based service used to verify access to the first web-based service.

14. The method of claim 13, wherein the authorization information includes a user name and password of the user that has the user account with the first web-based service.

15. The method of claim 1, further comprising setting up the user account of the management service in response to user activation.

16. The system of claim 5, wherein the transmitting of the file to the determined destination storage location comprises transmitting the file to the first web-based service that stores the file at the determined destination storage location.

17. The system of claim 5, wherein the authorization is included in the user account of the management service, and the authorization includes authorization information of the user account of the first web-based service, the authorization information of the user account of the first web-based service useable to verify access to the first web-based service.

18. The system of claim 17, wherein the authorization information includes a user name and password of the user that has the user account with the first web based service.

19. The non-transitory computer readable storage medium of claim 10, wherein the plurality of web-based services are associated with respective application programming interfaces included in the management service, wherein the user account of the management service is linked to the user's user accounts of the plurality of web-based services, and wherein the application programming interfaces are used for transmitting a file received from the peripheral device to the respective web-based services.

20. The non-transitory computer readable storage medium of claim 10, wherein the authorization is included in the user account of the management service, and the authorization includes authorization information of the user account of the first web-based service, the authorization information of the user account of the first web-based service used to verify access to the first web-based service.

21. The method of claim 1, wherein transmitting the file comprises transmitting the file using the user account of the management service to the user account of the selected first web-based service.

22. The system of claim 5, wherein the transmitting of the file comprises transmitting the file using the user account of the management service to the user account of the selected first web-based service.

23. The non-transitory computer readable storage medium of claim 10, wherein transmitting the file comprises transmitting the file using the user account of the management service to the user account of the first web-based service.

* * * * *